United States Patent [19]
Weiten

[11] Patent Number: 5,243,871
[45] Date of Patent: Sep. 14, 1993

[54] CONTROL LEVER APPARATUS FOR GENERATING ELECTRICAL CONTROL SIGNALS

[75] Inventor: Dean M. Weiten, Headingley, Canada

[73] Assignee: Ford New Holland, Inc., New Holland, Pa.

[21] Appl. No.: 928,485

[22] Filed: Aug. 13, 1992

[51] Int. Cl.$^5$ .............................................. B60K 20/00
[52] U.S. Cl. .................................................. 74/473 R
[58] Field of Search ............................... 74/335, 473 R

[56] References Cited
U.S. PATENT DOCUMENTS

| | | | |
|---|---|---|---|
| 4,519,266 | 5/1985 | Reinecke | 74/473 R |
| 4,555,959 | 12/1985 | Braun | 74/335 X |
| 4,621,328 | 11/1986 | Arai et al. | 74/335 X |
| 4,660,430 | 4/1987 | Bartfeld et al. | 74/335 |
| 5,035,113 | 7/1991 | Simonyi et al. | 74/335 X |

*Primary Examiner*—Dirk Wright
*Attorney, Agent, or Firm*—Larry W. Miller; Frank A. Seemar

[57] ABSTRACT

A shift lever control apparatus for generating electrical control signals for controlling a remote transmission shift system. A lever moves in two orthogonal directions and is shiftable to a plurality of positions. An array of electrical detectors sense the position of the lever and generate an electrical signal indicating the position of the lever to a microprocessor.

18 Claims, 8 Drawing Sheets

CONTROL LEVER APPARATUS FOR GENERATING ELECTRICAL CONTROL SIGNALS

FIELD OF THE INVENTION

This invention relates to a control lever apparatus for generating electrical control signals.

It is known in vehicles to provide a joy stick-type shift lever arrangement which is not mechanically connected to the transmission shifting system but is instead electrically detected so as to generate electrical control signals in a digital logic form to transmit to the remote transmission system.

One example of a device of this type is shown in U.S. Pat. No. 4,926,172 assigned to Dickey-John Corporation. This devices provides a lever which is mounted in a housing and is pivotally mounted relative to the housing to move in two directions that is forwardly and rearwardly to indicate forward and rearward movement respectively of the vehicle from a central neutral position and also to left and right directions to indicate upshift and downshift while in the respective forward, neutral and reverse positions.

This device includes a shielding plate arrangement which is moved in relation to movement of the lever and this provides electrical outputs at various detection element in response to the movement of the lever. These electrical output signals are then monitored to provide a control signal to the remote shifting system.

The above device has operated effectively and has been commercially accepted but is relatively complex and accordingly is relatively expensive in view of the high number of manufactured parts.

SUMMARY OF THE INVENTION

It is one object of the present invention to provide an improved shift control lever apparatus of this general type.

According to the invention, therefore, there is provided a shift control lever apparatus for generating electrical control signals for controlling a remote transmission shift system comprising a housing, a lever, means mounting the lever in the housing for movement in two orthogonal directions, a manually graspable element on the lever projecting outwardly from the housing for actuating movement of the lever relative to the housing to cause the lever to take up a plurality of different positions relative to the housing indicative of different control requirements, and means for generating said electrical control signals in response to movement of the lever comprising a single detection element mounted for movement in response to movement of the lever and an array of detectors fixed relative to the housing, each detector being responsive to movement of the detection element to a position adjacent the respective detector to produce an electrical output signal, the array being arranged such that movement of the lever causes the single detection element to move to a position adjacent different ones of the detectors in response to movement of the lever to said different positions, and processor means responsive to said output signals for generating said electrical control signals.

One embodiment of the invention will now be described in conjunction with the accompanying drawings in which:

DESCRIPTION OF THE DRAWINGS

In the drawings like characters of reference indicate corresponding parts in the different figures.

DETAILED DESCRIPTION

Figure 4:
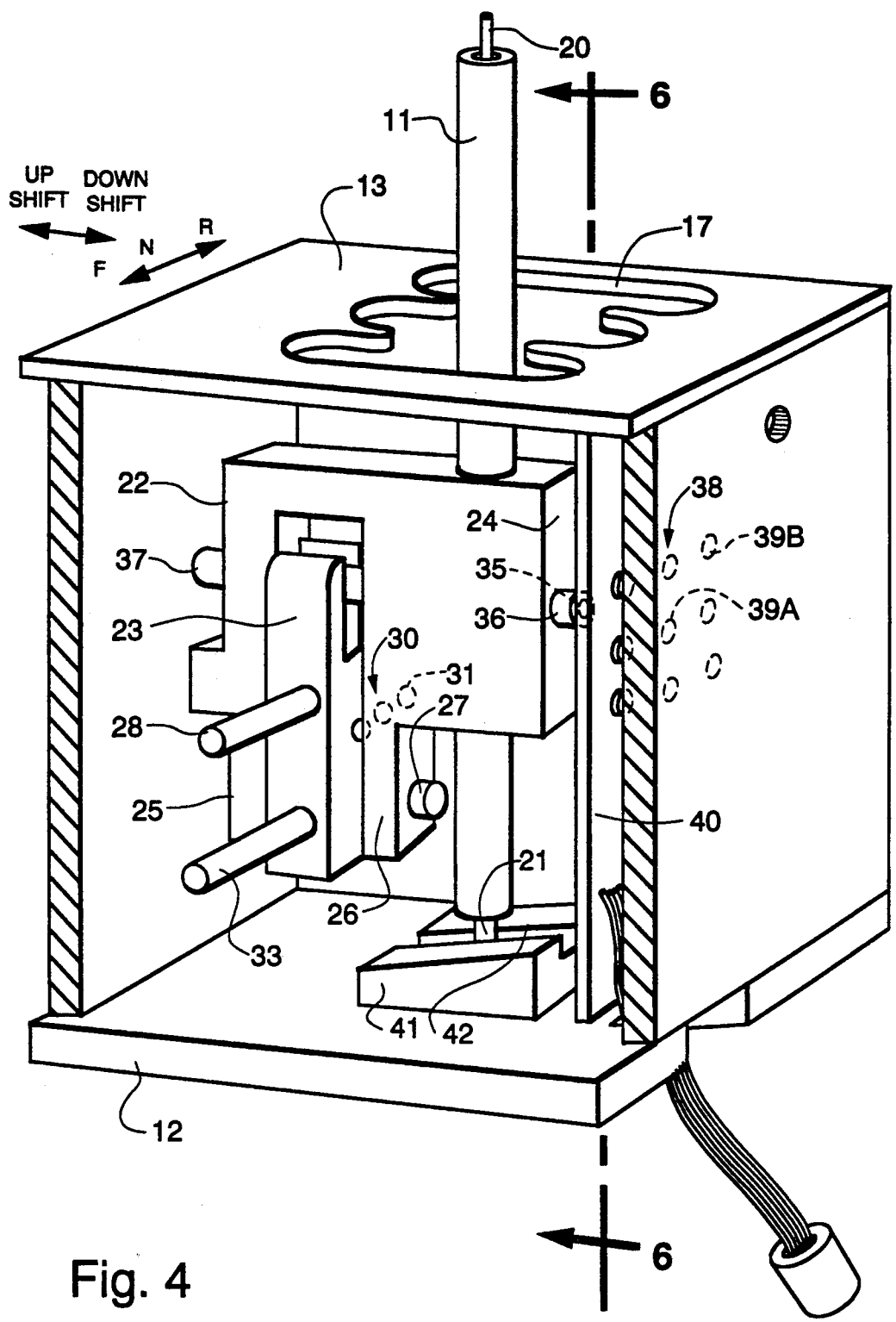
FIG. 4 is a isometric view of the mechanical linkage and detection array of the lever system of the present invention.
Figure 5:
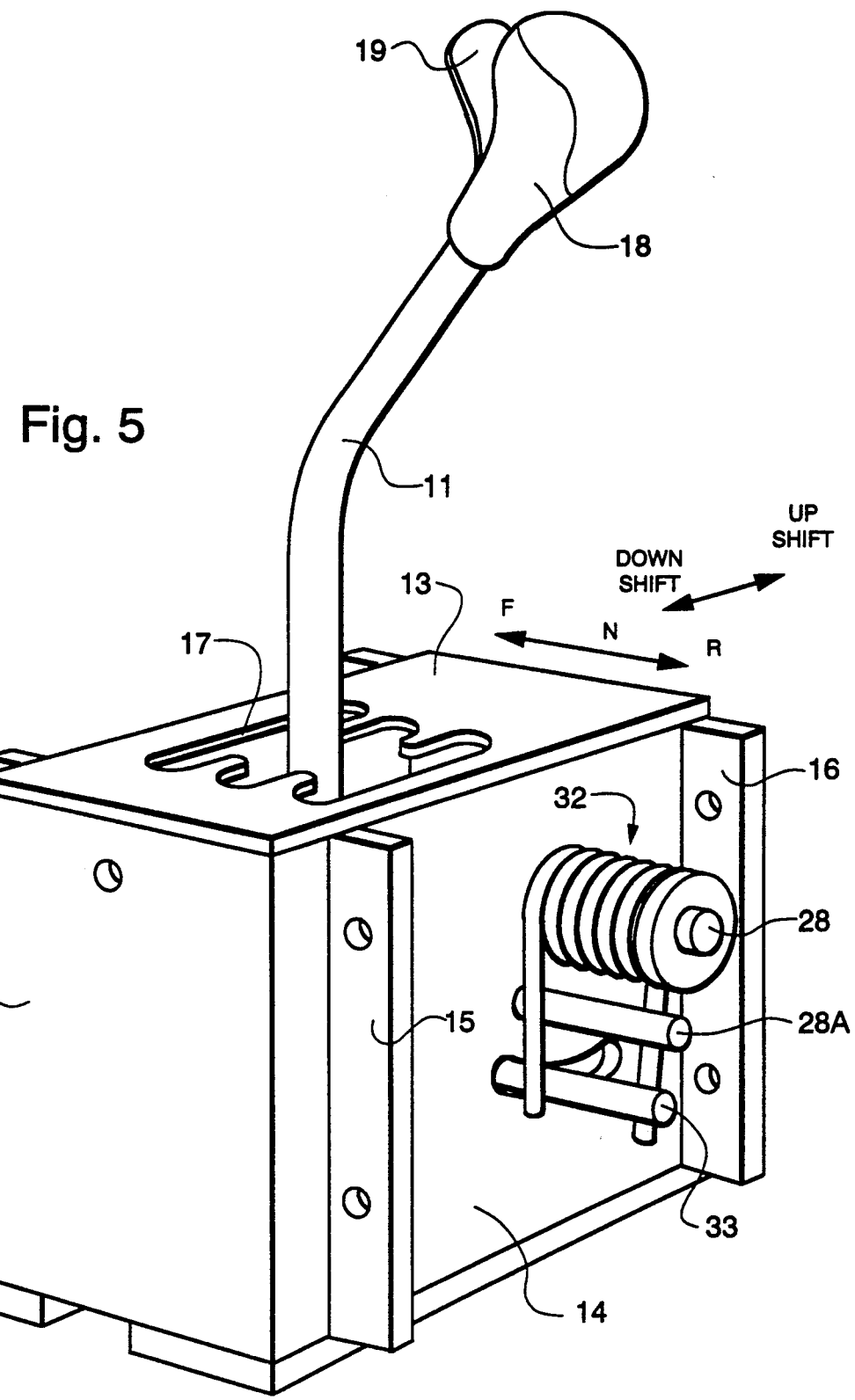
FIG. 5 is an isometric view showing a rear part of the apparatus of FIG. 5.
Figure 6:
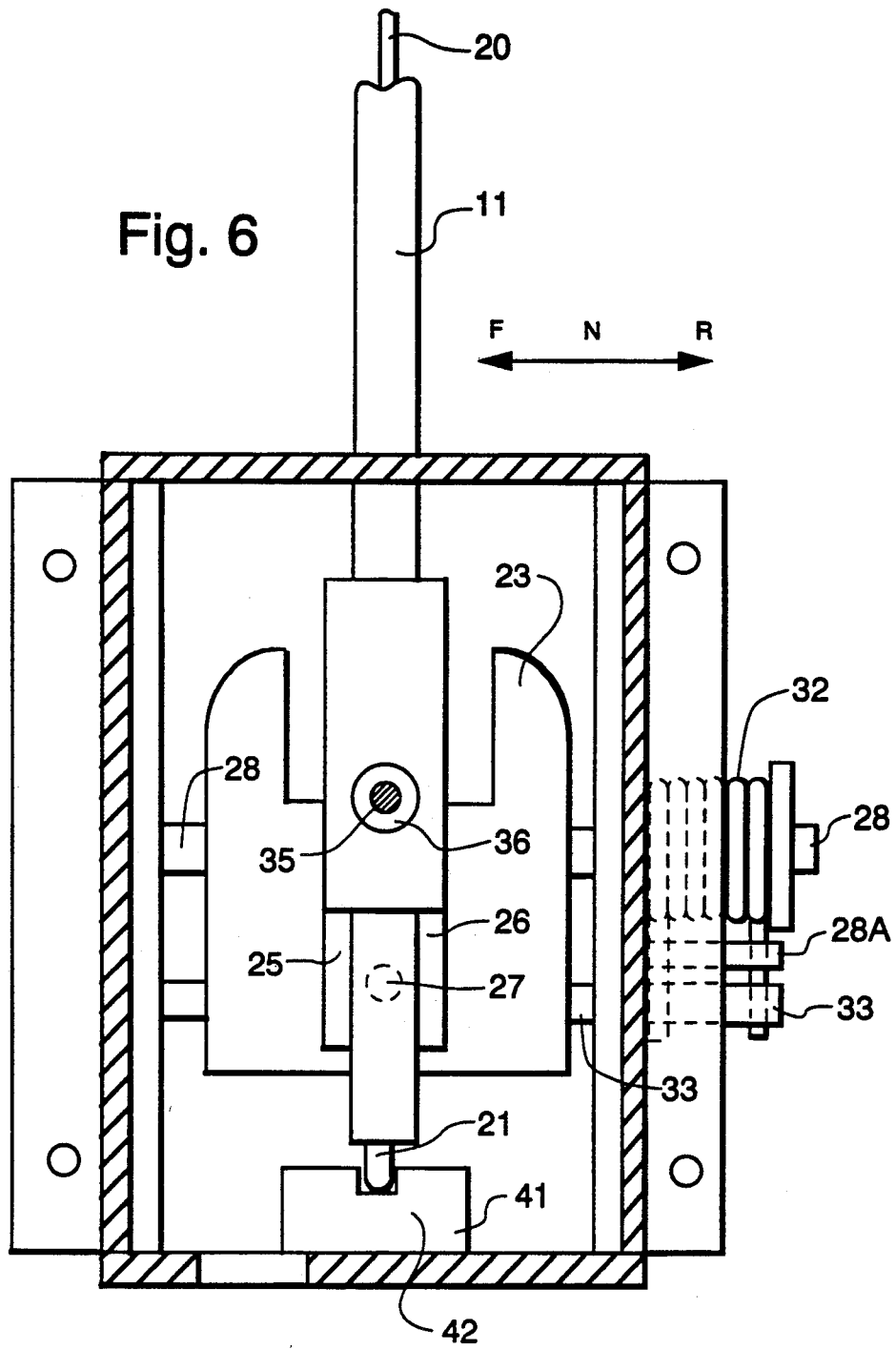
FIG. 6 is a view along the lines 6—6 of FIG. 4.

Turning now to FIGS. 4,5 and 7 the mechanical elements of the apparatus comprise a housing 10 and a manually operable lever 11 mounted within the housing and movable relative thereto. The housing includes a base plate 12, a top plate 13 and four vertical walls arranged to form a rectangular box. A rear wall 14 includes a pair of vertical rearwardly extending spaced flanges 15 and 16 for mounting the housing in the cab of a vehicle, for example.

The top plate 13 includes a gate 17 for guiding movement of the lever 11. The gate controls movement of the lever from a central initial position shown in the drawings forwardly and rearwardly and also from side to side. The central position is indicative of a neutral position of the remote shift transmission to be controlled, the forward position is indicative of a forward movement of the transmission and the rearward position is indicative of a rearward operation of the transmission. At each of the three positions the lever is movable from side to side. In a central position the lever is indicative of a requirement to remain in the gear presently held. Movement of the lever toward the right is indicative of an upshift of the transmission. Movement toward the left is indicative of a downshift. Thus the gate defines effectively 9 positions of a lever.

The lever 11 includes a manually graspable knob 18 at an upper end together with a sublever 19 which can be pulled while grasping the knob 18 to cause actuation of a longitudinal actuating rod 20 extending along an interior of the lever 11. The actuating rod 20 is connected with a pin 21 at a bottom end of the lever.

The lever is mounted on a mounting system allowing the pivotal movement of the lever within the housing. The mounting system includes a clevis member 22 and a pivot plate 23. The clevis member 22 includes a projection 24 at one side through which the lever passes. The clevis member further includes a pair of depending legs 25 and 26 which lie either side of the pivot plate 23 so that the pivot plate is received therebetween with front and rear faces of the pivot plate in sliding contact with the inside surfaces of the legs 25 and 26. A pivot pin 27 passes through the legs at a position adjacent the bottom of the legs and through the lower part of the pivot plate 23 so as to allow pivotal movement of the clevis relative to the pivot plate about the pin 27. The pin 27 lies at right angles to the lever 11. The pivot plate 23 is pivotally mounted on the housing by a pivot pin 28 which passes through the pivot plate from side to side and through openings in the front and rear walls of the housing. The pin 28 thus defines an axis of pivotal movement which is at right angles to the pin 27 and both are at right angles to the lever.

In movement to the lever, therefore, the lever in the forward to reverse direction pivots about the pin 27 by pivotal movement of the clevis member 22 relative to the pivot member. The pivot member remains stationary. There is provided a detent mechanism schematically indicated at 30 between one surface of the clevis member and an adjacent surface of the clevis member and an adjacent surface of the plate member. The detent mechanism comprises a ball spring mounted on the clevis member which can be received in recesses 31 provided in the adjacent face of the plate member. This provides three separate positions in each of which the lever is stable corresponding to the reverse, neutral and forward positions of the lever in the gate 17.

The lever when moved in the side to side direction causes pivotal movement of the plate member 23 about the pin 28 carried on the housing. This of course also allows the clevis member to pivot about the same axis together with the lever attached thereto. The pivotal movement about the pin 28 is controlled by a spring device 32 which is mounted on the pin 28 and cooperates with a transverse control pin 33 carried by the plate member and projecting through the rear wall of the housing. The spring 32 is wrapped around the pin 28 and is located by engagement of its depending ends with a fixed pin 28A. The depending ends 32A, 32B are arranged to engage the end of the pin 33 which projects through a slot 34 in the rear wall of the housing so as to hold the pin and therefore the lever in a central position.

On one end face of the clevis member 22 is mounted a magnet 35 carried in a magnet holder 36. The magnet is supported at a position extending generally at right angles to the lever and on one side of the lever. At the opposed end face of the clevis member is provided a stop member 37. The stop member 37 operates as an end stop for the movement of the lever in the side to side direction.

The position of the magnet is detected by an array 38 of hall effect detectors 39 which are located substantially in three columns and three rows so as to simulate the positions of the lever at the gate.

The location of the pivot pin 28 which is offset to one side of the lever ensures that movement of the lever about the pivot axis causes translational movement of the magnet in a vertical direction to traverse the array or matrix of the detectors. Similarly the position of the pin 27 which is offset from the pin 28 downwardly along the length of the lever causes translational movement of the magnet in response to pivotal movement about the pin 27. The position of the magnet moves in arcs about the respective pivot pins. The location and orientation of the array is arranged such that the magnet is moved by the lever such that it lies on a line substantially normal to the hall effect device.

The detectors 39 are mounted upon a printed circuit board 40 and are mounted on the face of that circuit board opposite to the magnet so that the clearance between the magnet and the hall effect device is necessarily and automatically provided by the thickness of the circuit board. The circuit board is arranged at right angles to the plane of movement of the lever that is at right angles to the gate 17.

A neutral lock 41 comprises a plate member mounted on the base plate 12 of the housing and defining a slot 42 along which the pin 21 can move. The slot is aligned with the central slot of the gate 17 so that when the pin is in the slot the lever is confined to the central slot of the gate. However when the pin is pulled by actuation of the lever 19, the lever can be moved back and forth to the forward and reverse positions.

Figure 1:
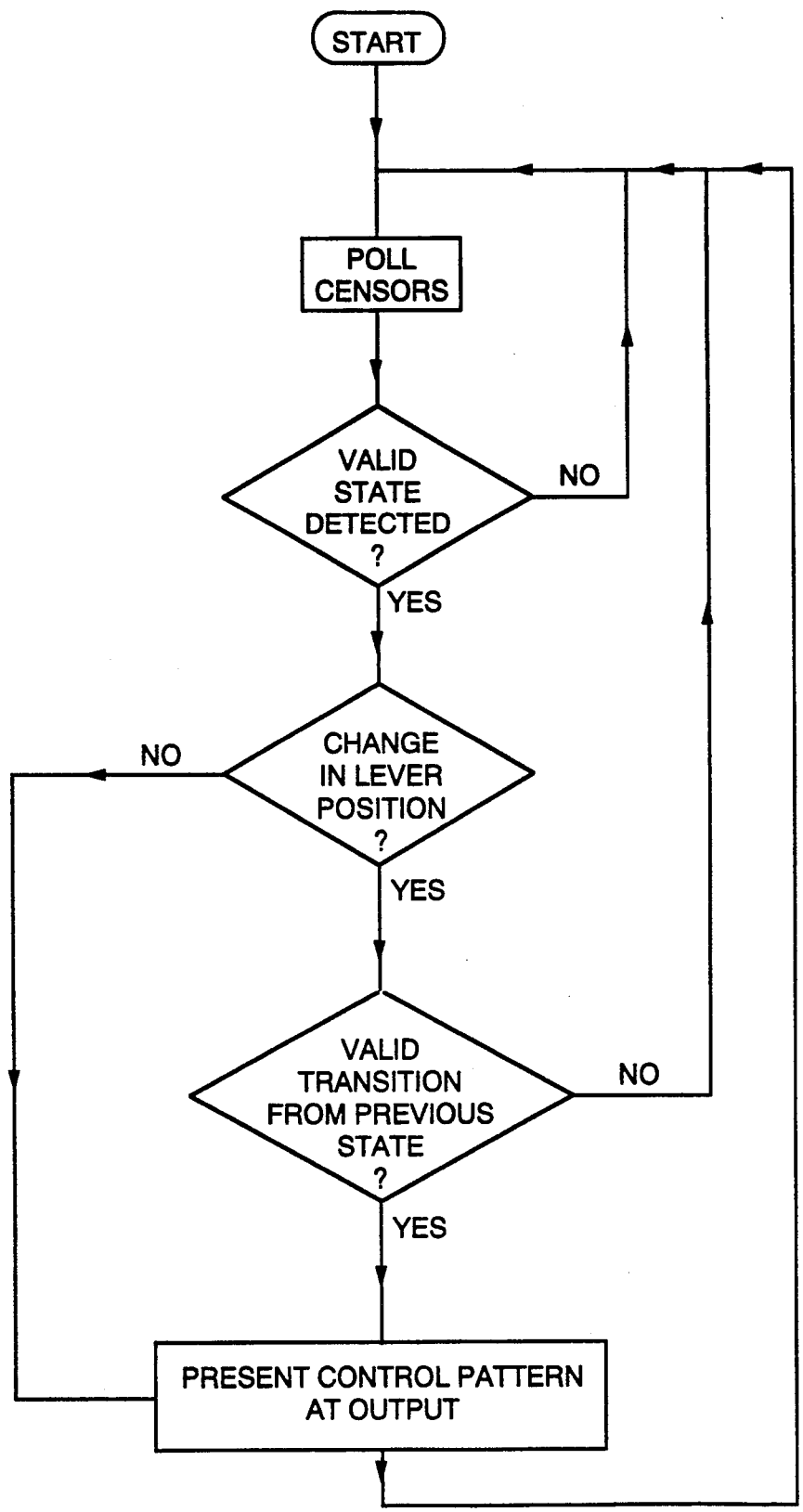
FIG. 1 is a simplified chart showing the system for controlling the electrical outputs from the apparatus.
Figure 2A:
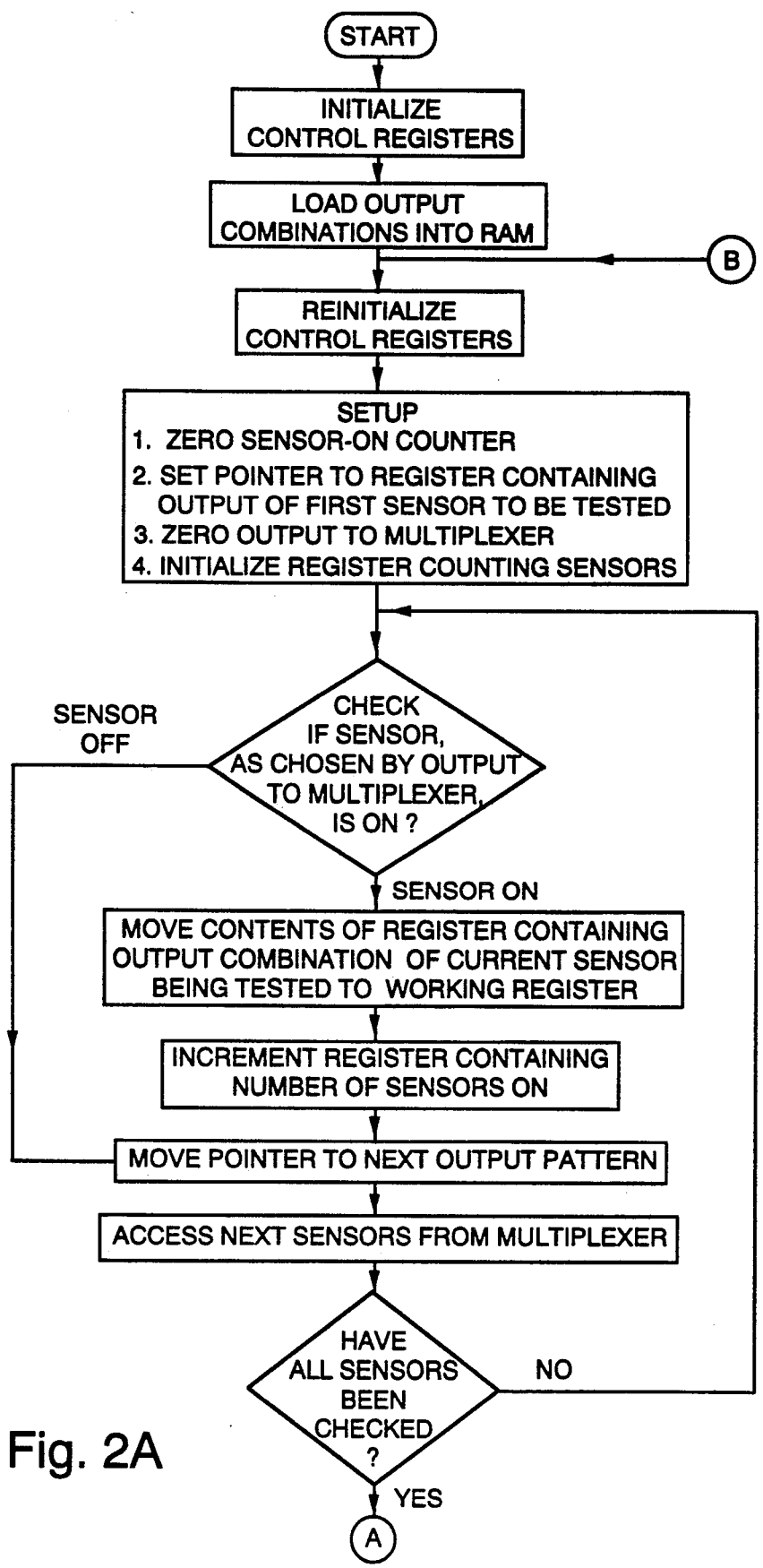
FIGS. 2A, 2B and 2C in combination comprise a more detailed flow chart showing the system of FIG. 1.
Figure 2B:
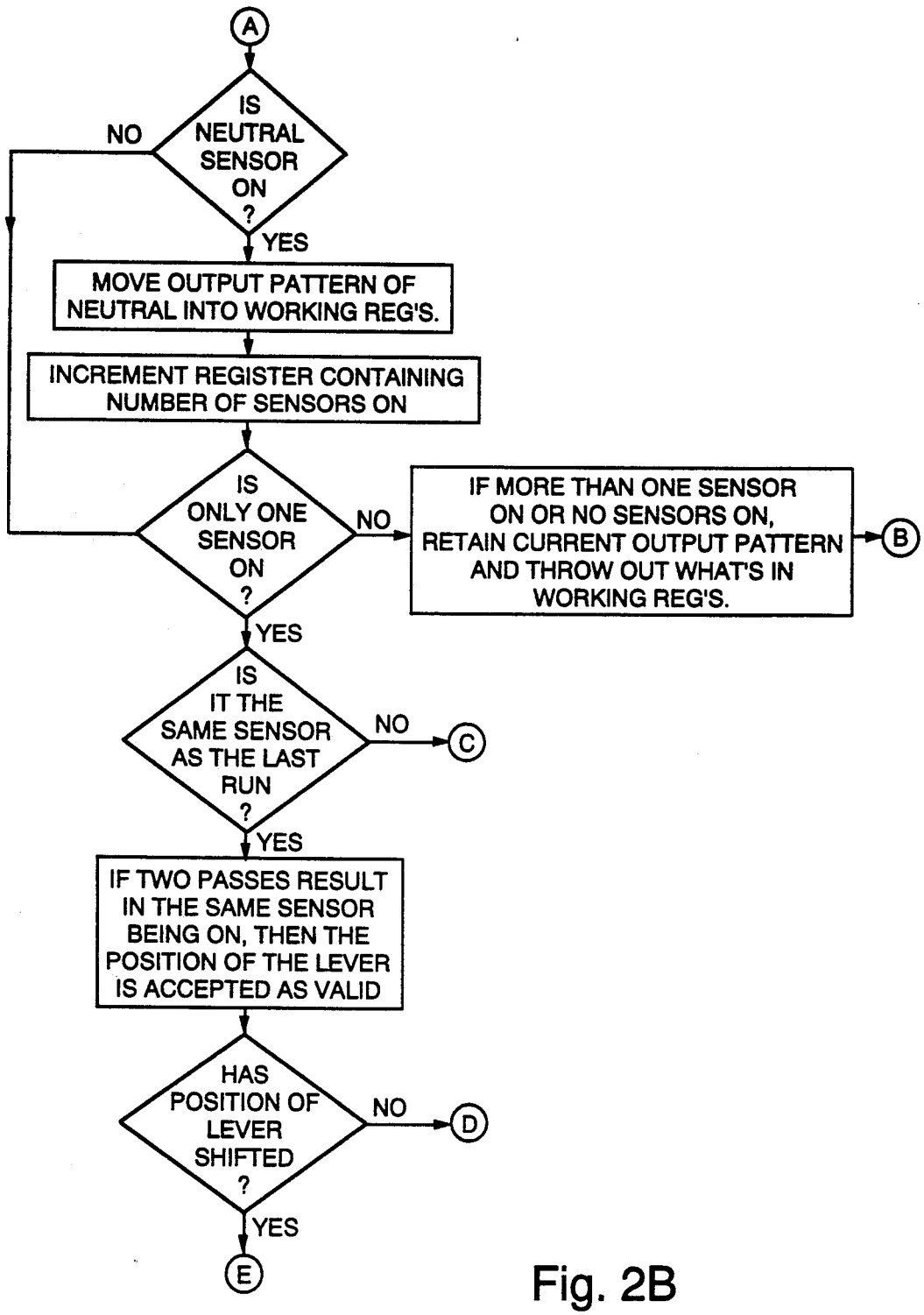
Figure 2C:
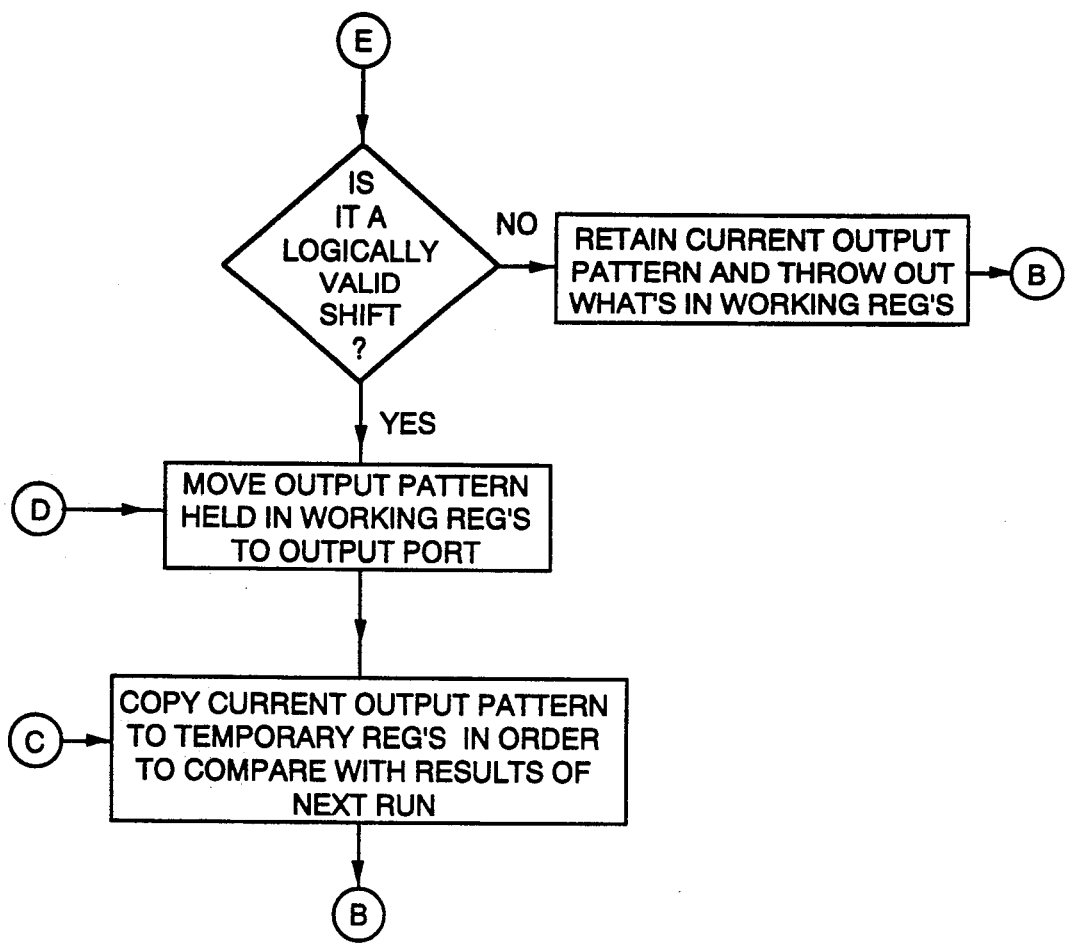
Figure 3:
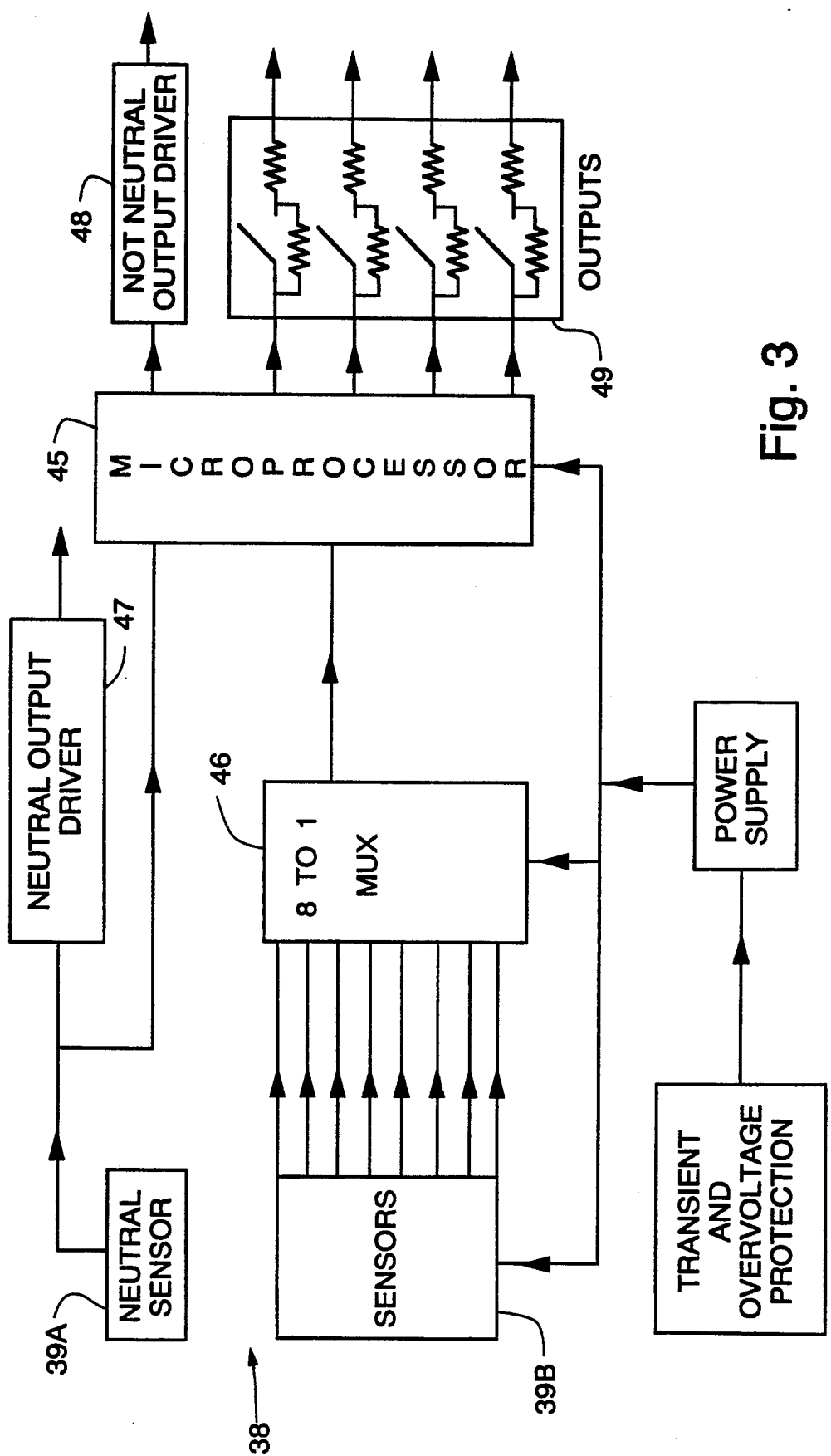
FIG. 3 is a schematic block diagram of the control circuit of the apparatus of the present invention.

Turning now to FIG. 3, the sensors are generally indicated at 38 including a neutral sensor 39A which is a central one of the sensors of the array and the remaining sensors of the array are indicated at 39B. A processor 45 is provided which receives the input from the sensors by a multiplexer 46. The neutral sensor 39A includes its own output driver 47 whereas the remaining sensors are communicated through a driver 48 and output unit 49 from the microprocessor. In the event of failure of the microprocessor, therefore, the neutral position state can still be obtained since the neutral sensor is communicated through a path which overrides the microprocessor.

The operation of the microprocessor is explained and set forth in the flow chart of FIGS. 1, and 2A, 2B, 2C the details of which will be self explanatory from a study of that flow chart.

However in general terms it will be noted that the microprocessor 45 acts to scan each of the sensors to determine the location of the lever by way of the position of the magnet in relation to the array. Thus the array is repeatedly scanned. When there is a change in position of the magnet due to a movement of the lever, the microprocessor acts to check whether the apparent movement, that is the change in the sensor providing an output signal is in accordance with the allowable movement of the lever due to the gate. If the movement is other than is allowable, the apparent movement is ignored and the sampling recycled. In addition if no output is detected due to the movement of the lever to a position intermediate two of the detectors, the absence of an output signal is again ignored and the sampling reverts to the previous detected position.

The outputs are used to drive the electronic control system for the shifting mechanism of a remote transmission system in a manner which is well known in the art and does not form part of the present invention.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. In a shift control lever apparatus for generating control signals for controlling a remote transmission shift system including a housing; a lever having a manually graspable element projecting outwardly from the housing for actuating movement of the lever relative to the housing to cause the lever to take up a plurality of different positions relative to the housing indicative of different control requirements; means mounting the lever in the housing for movement in two orthogonal directions; and means for generating said electrical control signals in response to movement of the lever, the improvement comprising:

a magnet defining a single detection element mounted for movement in response to movement of the lever;

an array of detectors fixed relative to said housing, each said detector being responsive to movement of the detection element to a position adjacent the respective detector to produce an electrical output signal, the array being arranged such that movement of the lever causes the single detection element to move to a position adjacent different ones of the detectors in response to movement of the lever to said different positions; and processor means responsive to said output signals for generating said electrical control signals.

2. The apparatus according to claim 1 wherein the detectors are hall effect devices.

3. The apparatus according to claim 1 wherein the detectors are arranged in rows and columns.

4. The apparatus according to claim 3 wherein the detectors are mounted on a circuit board carried in the housing.

5. The apparatus according to claim 1 wherein said mounting means comprises a first pivot member and a second pivot member, the second pivot member being mounted for pivotal movement relative to the housing about a first axis transverse to the housing and the first pivot member being mounted on the second pivot member for pivotal movement relatively thereto about a second axis at right angles to the first axis and offset therefrom such that pivotal movement of the lever about said first and second axis causes translational movement of the detection element relative to the array.

6. The apparatus according to claim 5 wherein the detection element is mounted on the first pivot member.

7. The apparatus according to claim 5 wherein the second axis is offset from the first axis in a direction longitudinal of the lever.

8. The apparatus according to claim 5 wherein the array is arranged in a plane at right angles to the plane of movement of an end of the lever.

9. The apparatus according to claim 8 including a gate in the plane of movement of the lever arranged to control movement of the lever.

10. The apparatus according to claim 5 wherein the second pivot member comprises a substantially flat plate member with said first axis extending across the plate member from one side to an opposed side and wherein the first pivot member comprises a clevis having two legs each depending along a respective one of front and rear faces of the plate member with the second pivot axis extending through the legs and through the plate member at right angles thereto.

11. The apparatus according to claim 10 including detent means positioned between the plate member and the clevis to locate the movement therebetween at a plurality of discrete positions of pivotal movement about the second axis.

12. The apparatus according to claim 1 wherein the array is arranged in a plane at right angles to the plane of movement of an end of the lever.

13. The apparatus according to claim 10 including spring means biasing the second pivot member about the first axis to a predetermined position.

14. The apparatus according to claim 5 including locking means for locking one of the pivot members against pivotal movement about its respective axis, the locking means being releasable by actuation of a manually operable member on said lever.

15. The apparatus according to claim 14 wherein the neutral lock means comprises a pin extending and movable longitudinally of the lever.

16. The apparatus according to claim 1 including gate means for controlling movement of the lever along a specific path wherein said processor means for repeatedly scanning the output signals from said detectors and for accepting a subsequent signal immediately following a previous signal only when the subsequent signal constitutes a next adjacent signal in relation to said path.

17. The apparatus according to claim 16 wherein the processor means is arranged on receipt of no output signals from said detectors to use as the output signal said previous output signal.

18. The apparatus according to claim 16 wherein some of the positions of the lever are associated with a neutral control of said remote transmission shift system and wherein said output signals are arranged relative to said processor means such that the output signals that those detectors associated with the neutral positions are bypassed relative to said processor means so as the ensure that control signals can be generated to cause movement of the remote transmission shift system to neutral upon failure of the processor means.

* * * * *